(No Model.)    2 Sheets—Sheet 1.

E. R. TOMLINSON
VALVE.

No. 259,991.    Patented June 20, 1882.

ATTEST:
John Buckler
Wm. Osgood

Edwin R. Tomlinson
INVENTOR
by Hanaford & Wren
Attorneys (No Model.) 2 Sheets—Sheet 2.
E. R. TOMLINSON.
VALVE.
No. 259,991. Patented June 20, 1882.
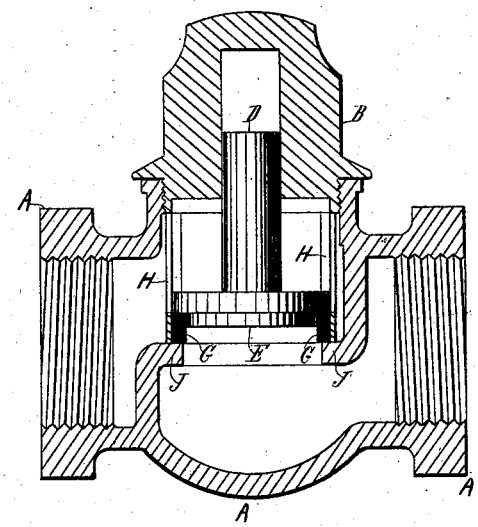
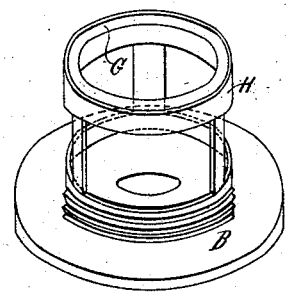
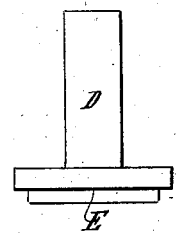
ATTEST-
John Buckler
Worth Osgood
Edwin R. Tomlinson
INVENTOR
by Hanaford & Wren
attorneys

UNITED STATES PATENT OFFICE.

EDWIN R. TOMLINSON, OF STRATFORD, ASSIGNOR TO HIMSELF AND EDWARD G. BURNHAM, OF BRIDGEPORT, CONNECTICUT.

VALVE.

SPECIFICATION forming part of Letters Patent No. 259,991, dated June 20, 1882.

Application filed March 24, 1882. (No model.)

*To all whom it may concern:*

Be it known that I, EDWIN R. TOMLINSON, a citizen of the United States, and a resident of Stratford, in the county of Fairfield and State of Connecticut, have invented a new and useful Improvement in Valves; and I hereby declare that the following is a full, clear, and exact description of the invention, sufficient to enable those skilled in the art to which it appertains to make and use the same, reference being had to the accompanying drawings, forming part of this specification.

My invention relates to the construction of all kinds of valves wherein the disk is held to its seat to form a tight joint.

In all kinds of valves where the valve or disk is forced against the seat by pressure the seats and valves become worn and have to be reground to place or entirely discarded.

Figure 1:
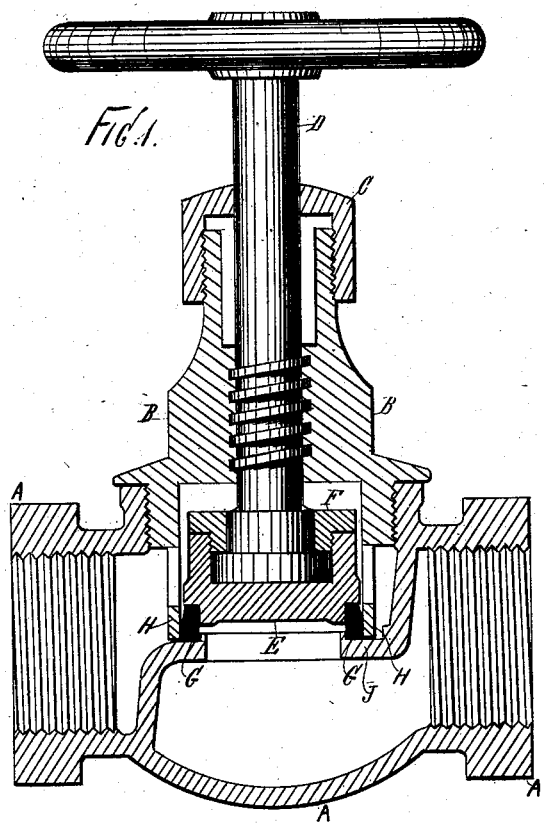
Figure 2:
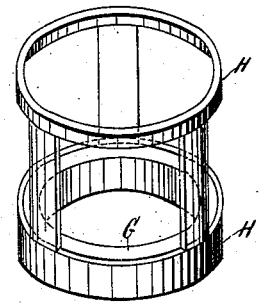
Figure 3:
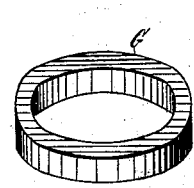

In the drawings, Figure 1 is a sectional view of a globe-valve, showing my improvements in place. Fig. 2 is a perspective view of the skeleton cylindrical cage H, showing the soft packing G in place. Fig. 3 is a perspective view of the removable loose ring or soft packing G. Fig. 4 is a sectional view of a check-valve, showing my improvements, the skeleton cage H, and the loose ring or soft packing G in place. Fig. 5 is a perspective view of the skeleton cage H attached to the under side of the cap B. Fig. 6 is a view of a valve-stem with the disk or valve attached.

A is the valve-case, having a female thread at the inlet and outlet ends, by means of which the supply and discharge pipes may be attached.

B is a cap through which the valve-stem D passes, as shown in Fig. 1, and into which it enters, as shown in Fig. 4.

E in Figs. 1, 4, and 6 is the disk. F in Fig. 1 is a nut, which is screwed into the disk E to attach the valve-stem D to the disk and allow the latter to revolve on said valve-stem.

G is a loose removable ring of packing, made of soft metal or other elastic material. H is a skeleton cylinder of the same internal diameter as the external diameter of the ring of packing G.

J is the permanent flat valve-seat.

The skeleton cylinder or cage H may be attached to the cap B or may be separate, as it is obvious that when the cage H is dropped upon the seat J the cap B, when screwed into place, as shown in Figs. 1 and 4, will hold the same firmly in place and also hold the removable soft-packing ring G firmly in its place.

Having the soft-packing ring on top of the hard-metal seat J, the latter will not wear, the wear and abrasion being all on the soft metal, and where the valve is a fixture the soft-metal ring G and cage H can be removed and replaced at any time by removing the cap B.

The permanent seat J and the disk E are both made flat on the bearing parts, as shown in the drawings, for the purpose of exerting a uniform pressure on the top and bottom of the removable seat of soft metal G.

By having the space between the permanent seat J and the disk E uniform, and the disk and permanent seat parallel to each other on the bearing-faces, the removable seat G will not spread from the center outwardly, as would be the case if the disk was made cone-shaped on the face.

Whatever tendency the removable seat G may have to spread outwardly and from the center when pressed between the flat-faced disk and the flat permanent seat J is entirely overcome by the frame or cage H inclosing the same, as shown at Figs. 1, 2, and 4. The disk E being constructed, as shown, Figs. 1 and 4, with the center of the flat face of the disk projecting below the outside annular bearing-face, and having a slight projection or lip around the orifice raised above the bearing-face of the permanent seat J, as shown at Figs. 1 and 4, when the removable seat G is compressed between the disk E and permanent seat J the removable seat G is prevented from closing together toward the center of the ring.

When it is desired to allow the passage of water or steam through the valve the hand-wheel on the stem D, Fig. 1, is turned to the left, which raises the disk or valve E from the ring or seat G. In the case of a check-valve, as shown in Fig. 4, the water being forced through from the pump, raises the disk E from off the seat G until the fluid has passed, the weight of the fluid on the other side keeping the disk in place on the seat.

I am well aware that valves have heretofore been made with a movable disk and a permanent seat therefor, with a removable rest or packing between said disk and seat; but

What I claim as my invention, and desire to secure by Letters Patent, is—

1. A valve having a flat-faced seat, J, in combination with a flat disk, E, and a loose ring or removable seat, G, as and for the purpose set forth.

2. In globe or other valves having a flat seat, J, a flat-faced disk, E, in combination with a loose ring or removable soft-metal seat, G, and a guide, H, as and for the purpose described.

3. A valve having a flat seat, J, and provided with a cap, B, in combination with a stem, D, carrying a flat-faced disk, E, a loose ring or removable soft-metal seat, G, and a guide, H, as set forth.

EDWIN R. TOMLINSON.

Witnesses:
GEO. H. NOYES,
HERMAN GAUSS.